United States Patent
Noguchi

(10) Patent No.: US 9,420,179 B2
(45) Date of Patent: Aug. 16, 2016

(54) OPTICAL DEVICE FOR PERFORMING IMAGE BLUR COMPENSATION

(75) Inventor: Masaaki Noguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 544 days.

(21) Appl. No.: 13/282,935

(22) Filed: Oct. 27, 2011

(65) Prior Publication Data

US 2012/0105656 A1     May 3, 2012

(30) Foreign Application Priority Data

Nov. 2, 2010 (JP) ................................ 2010-246750
Dec. 6, 2010 (JP) ................................ 2010-271953

(51) Int. Cl.
  H04N 5/228   (2006.01)
  H04N 5/232   (2006.01)

(52) U.S. Cl.
  CPC ......... *H04N 5/23245* (2013.01); *H04N 5/2328* (2013.01); *H04N 5/23258* (2013.01); *G03B 2205/0007* (2013.01); *G03B 2205/0046* (2013.01); *G03B 2217/005* (2013.01)

(58) Field of Classification Search
  CPC .......... H04N 5/23245; H04N 5/23258; H04N 5/2328; G03B 2205/0046; G03B 2205/0007; G03B 2217/005
  USPC ................. 348/208.99, 208.2–208.5, 208.11, 348/208.13, 220.1, 348, 347, 352; 396/52, 396/55
  See application file for complete search history.

(56) References Cited

U.S. PATENT DOCUMENTS

2004/0223073 A1* 11/2004 Kanai ............................ 348/345
2006/0193629 A1*  8/2006 Ootsuka et al. ................ 396/457
2010/0172639 A1*  7/2010 Ohishi ............................ 396/55

FOREIGN PATENT DOCUMENTS

| JP | 2006-047742 A |  2/2006 |
| JP | 2007-147669 A |  6/2007 |
| JP | 2008-051955 A |  3/2008 |
| JP | 2008-298849 A | 12/2008 |
| JP | 2009-047757 A |  3/2009 |

OTHER PUBLICATIONS

Japanese Office Action issued on Sep. 18, 2012 in corresponding application No. 2010-246750.
Japanese Office Action issued on Nov. 16, 2012 in corresponding Japanese Patent Application No. 2010-246750.
Office Action issued on Feb. 1, 2013 in counterpart Japanese Application No. 2010-271953.

* cited by examiner

Primary Examiner — Twyler Haskins
Assistant Examiner — Carramah J Quiett
(74) Attorney, Agent, or Firm — Carter, DeLuca, Farrell & Schmidt, LLP

(57) ABSTRACT

An optical device comprises an image blur compensation unit which compensates a blur in an image formed by an imaging optical system, the image blur compensation unit being movable in directions not parallel to an optical axis of the imaging optical system, a shake detection unit which detects shake of a device, a position detection unit which detects a position of the image blur compensation unit, the position detection unit having a detection accuracy that is variable, a driving control unit which calculates a driving target position of the image blur compensation unit based on an output from the shake detection unit and position information of the image blur compensation unit, and a control unit which controls detection accuracy of the position detection unit to set the detection accuracy of the position detection unit to a greater value in still image capture than a value in video capture.

14 Claims, 8 Drawing Sheets

F I G. 3A
HALL OFFSET ADJUSTMENT
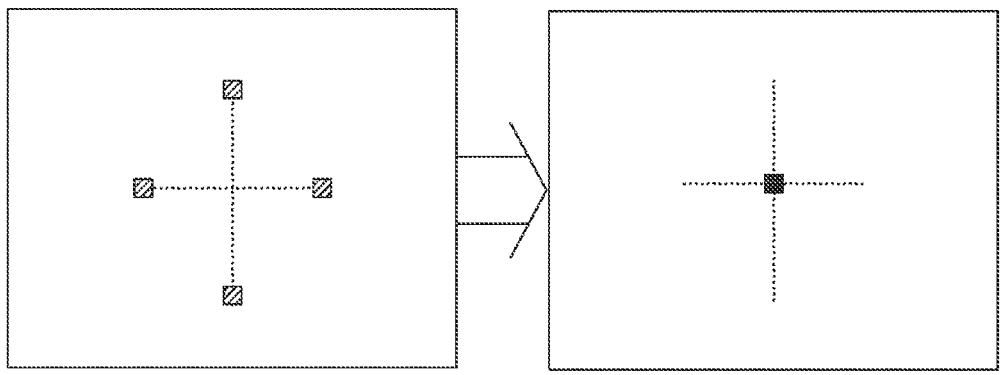
MEASUREMENT OF LIMITS OF SHIFT LENS DRIVING RANGE → CALCULATION OF MECHANICAL CENTER
F I G. 3B
HALL GAIN ADJUSTMENT
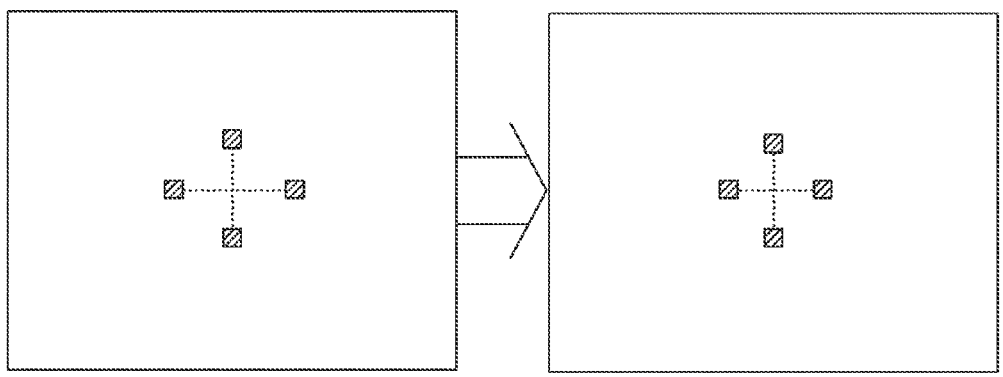
DRIVING OF SHIFT LENS BY PREDETERMINED COMMAND AMOUNT → ADJUSTMENT OF MOVING AMOUNT OF ANGLE OF VIEW

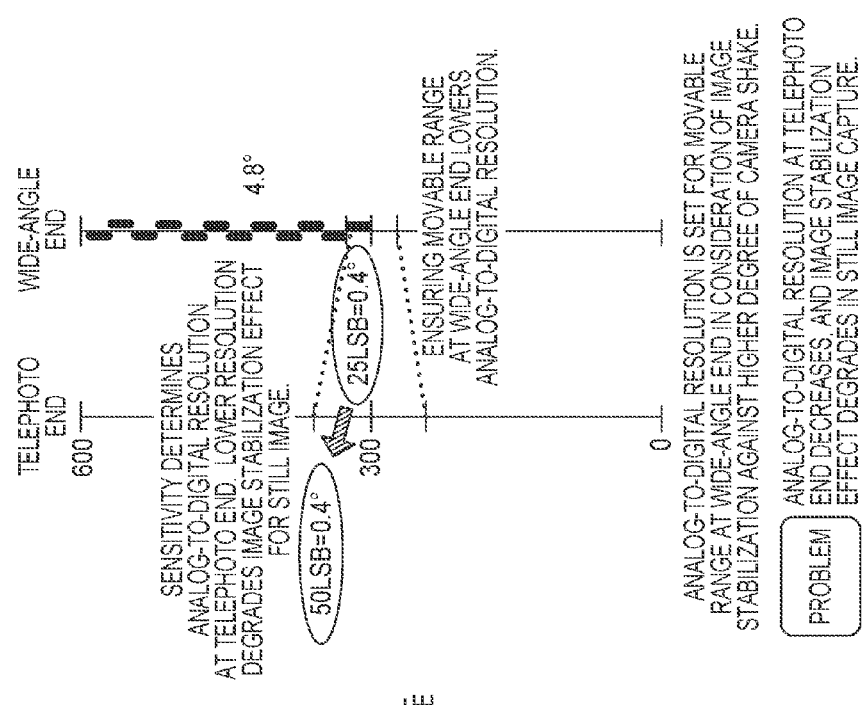
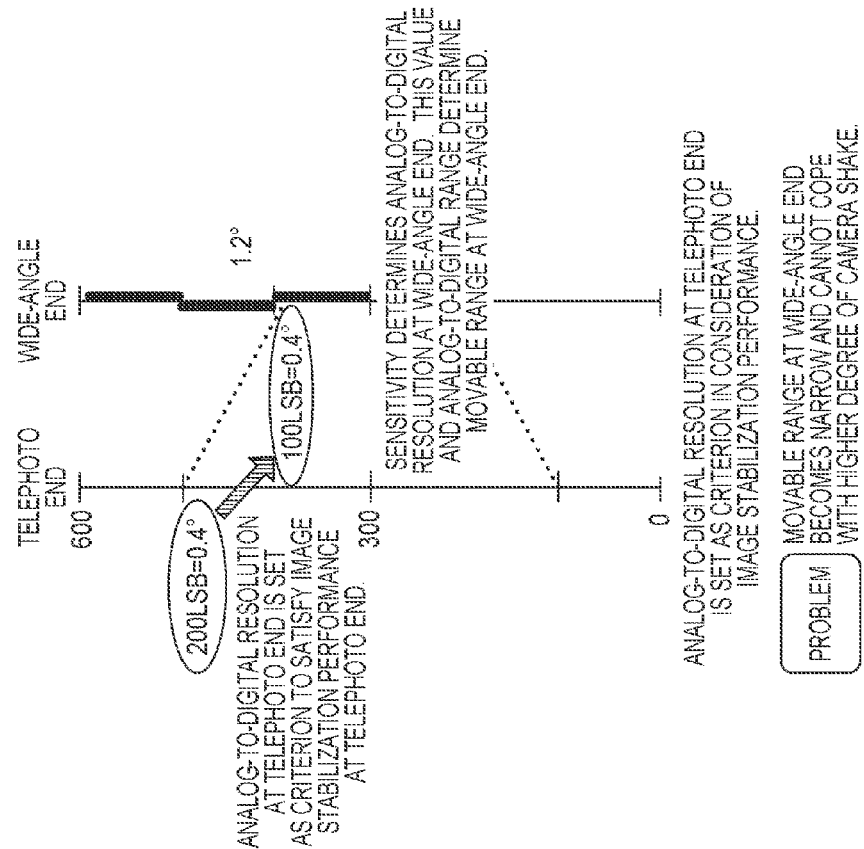

FIG. 6A

STILL IMAGE MODE

TELEPHOTO END 600 — 200LSB=0.4° — 100LSB=0.4° — 300 — 0

WIDE-ANGLE END — ABOUT 1.2°

FIG. 6B

VIDEO MODE

TELEPHOTO END 600 — 50LSB=0.4° — 300 — 25LSB=0.4° — 0

WIDE-ANGLE END — ABOUT 4.8°

TARGET WIDTH IS SWITCHED IN SWITCHING CAPTURE MODE.

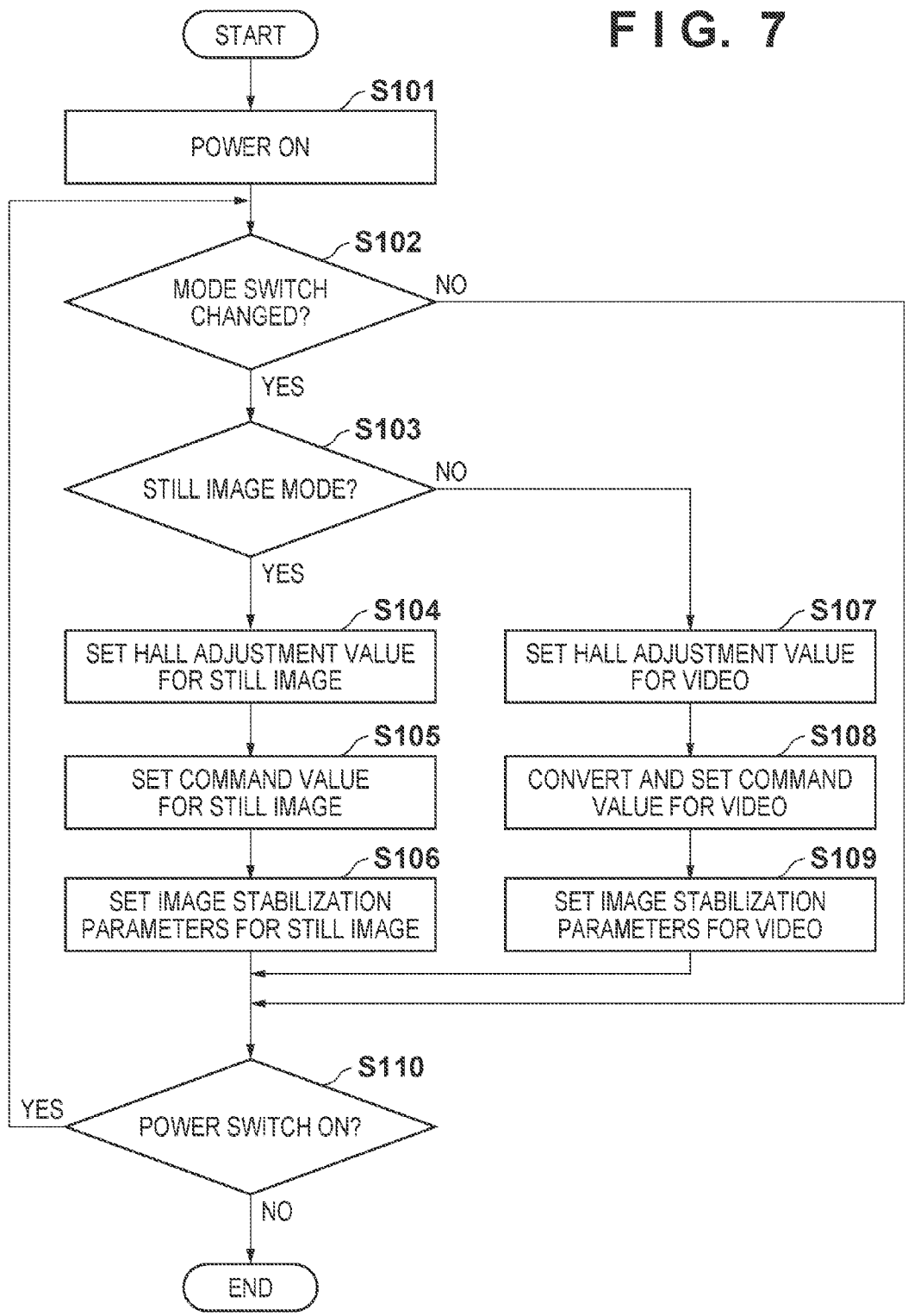

HALL ADJUSTMENT FLOWCHART

SHIFT BY HALL OFFSET ADJUSTMENT

ADJUSTMENT TO HALL OFFSET ADJUSTMENT POSITION (DRIVING CENTER POSITION) FOR STILL IMAGE CAPTURE USING EVEN COMMAND CENTER VALUE

OPTICAL DEVICE FOR PERFORMING IMAGE BLUR COMPENSATION

BACKGROUND OF THE INVENTION

1. Field of the Invention

The present invention relates to an image capture apparatus and optical device and, more particularly, to an image capture apparatus having an image stabilization function.

2. Description of the Related Art

Image capture apparatuses are conventionally known which have an image stabilization apparatus that detects a shake of the image capture apparatus and drives an imaging lens movable to compensate for image blur caused by the shake. Recently, image stabilization apparatuses have become known which compensate for higher degrees of camera shake, such as that which may occur when shooting while walking; they are more effective as the zoom approaches full wide angle (to be referred to as a dynamic mode).

One example of an image capture apparatus which compensates for higher degrees of camera shake is disclosed in Japanese Patent Laid-Open No. 2006-47742.

However, in the conventional technique disclosed in Japanese Patent Laid-Open No. 2006-47742, the driving resolution of a shift lens drops when the movable range is widened in accordance with the orientation of the image capture apparatus while shooting. In still image capture, this influence stands out as degradation of the image stabilization effect. When the movable range is widened, an image quality decrease such as a degradation in image resolution may occur in a still image due to the characteristics of the optical lens.

SUMMARY OF THE INVENTION

The above problems are addressed by this disclosure and the camera shake suppression effect is achieved while preventing degradation of the image quality in both video and still image capture.

According to a first aspect, there is provided an optical device comprising: an image blur compensation unit which compensates for a blur in an image formed by an imaging optical system, the image blur compensation unit being movable in directions not parallel to an optical axis of the imaging optical system; a shake detection unit which detects shake of a device; a position detection unit which detects a position of the image blur compensation unit, the position detection unit having a detection accuracy that is variable; a driving control unit which calculates a driving target position of the image blur compensation unit based on an output from the shake detection unit and position information of the image blur compensation unit that is detected by the position detection unit; and a control unit which controls detection accuracy of the position detection unit to set the detection accuracy of the position detection unit to a greater value in still image capture than a value in video capture.

According to the second aspect of the present invention, there is provided an optical device control method comprising: an image blur compensation step of causing an image blur compensation unit movable in a plurality of directions not parallel to an optical axis of an imaging optical system, to compensate for a blur in an image formed by an imaging optical system; a shake detection step of causing a shake detection unit to detect shake of a device; a step of causing a position detection unit having variable detection accuracy to detect the position of the image blur compensation unit; a driving control step of calculating a driving target position of the image blur compensation unit based on an output from the shake detection unit and position information of the image blur compensation unit that is detected by the position detection unit; and a control step of controlling detection accuracy of the position detection unit to set the detection accuracy of the position detection unit higher in still image capture than in video capture.

Further features of the present invention will become apparent from the following description of exemplary embodiments with reference to the attached drawings.

BRIEF DESCRIPTION OF THE DRAWINGS

FIGS. 3A and 3B are schematic views showing the Hall adjustment according to the embodiment of the present invention;

FIGS. 5A and 5B are views for explaining in detail the analog-to-digital resolution according to the embodiment of the present invention;

FIGS. 6A and 6B are views showing switching of the analog-to-digital resolution between the still image capture mode and the video capture mode according to the embodiment of the present invention;

FIG. 7 is a flowchart showing switching of the analog-to-digital resolution according to the embodiment of the present invention.

DESCRIPTION OF THE EMBODIMENTS

Embodiments will now be described in detail with reference to the accompanying drawings.

Figure 1:
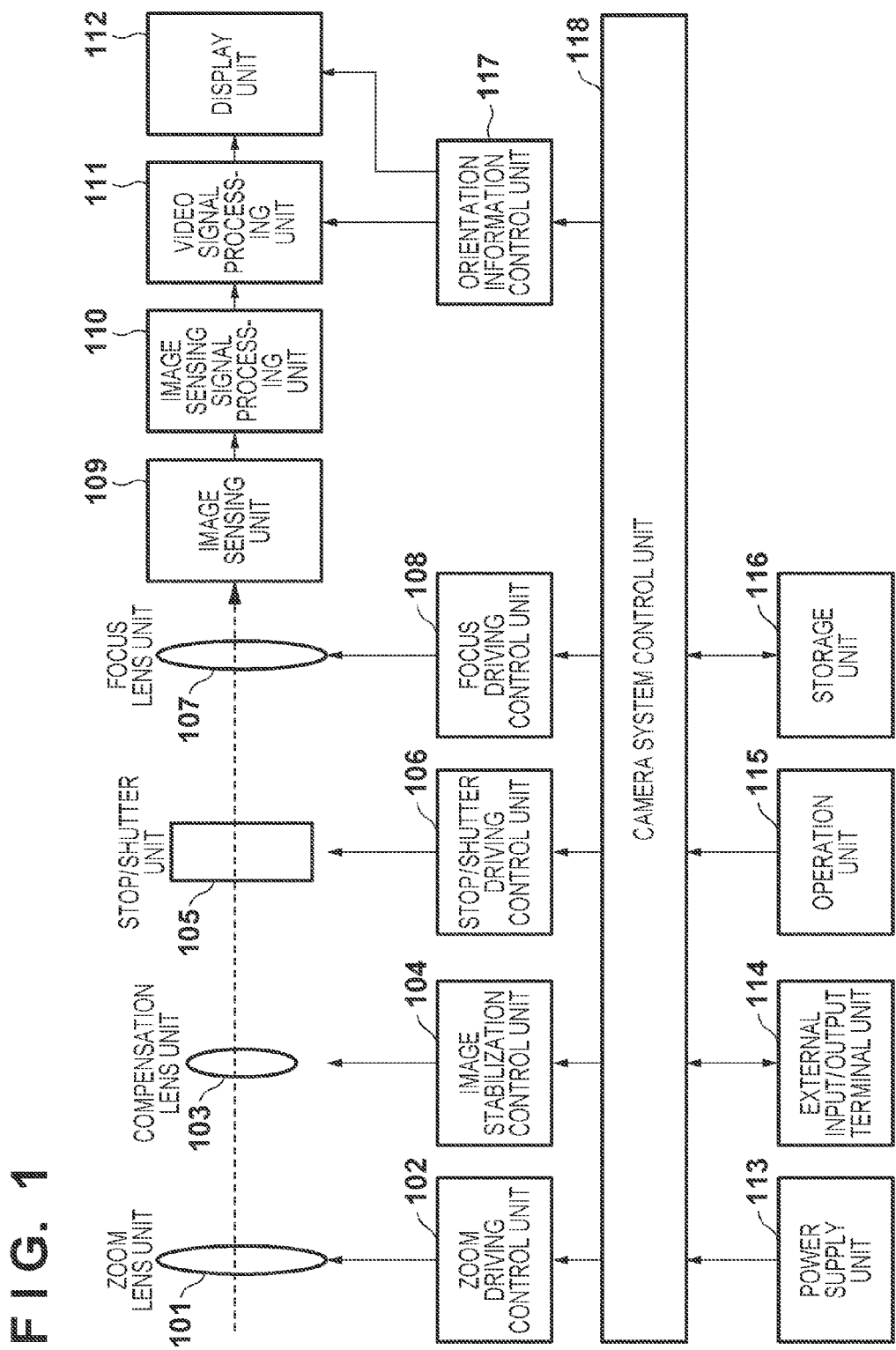
FIG. 1 is a block diagram showing an image capture apparatus according to an embodiment of the present invention.

FIG. 1 is a block diagram showing the arrangement of an image capture apparatus according to an embodiment of the present disclosure. The image capture apparatus is a digital camera mainly for the capture of still images and videos.

Referring to FIG. 1, a zoom lens unit 101 includes a zoom lens for zooming. A zoom driving control unit 102 performs control to drive the zoom lens unit 101. A compensation lens unit 103 includes a shift lens capable of changing its position in directions not parallel to the optical axis, particularly a direction perpendicular to the optical axis. An image stabilization control unit 104 performs control to drive the compensation lens unit 103.

A stop/shutter driving control unit 106 performs control to drive a stop/shutter unit 105. A focus lens unit 107 includes a focus lens for adjusting the focus. A focus driving control unit 108 performs control to drive the focus lens unit 107. The zoom lens unit 101, compensation lens unit 103, stop/shutter unit 105, and focus lens unit 107 are arranged within an imaging optical system which forms an object image.

An image sensing unit 109 converts an optical image having passed through the lens units into an electrical signal. An image sensing signal processing unit 110 converts the electrical signal output from the image sensing unit 109 into a video signal. A video signal processing unit 111 processes the video signal output from the image sensing signal processing unit 110 in accordance with an application purpose. If necessary, a display unit 112 displays an image based on the signal output from the video signal processing unit 111. A power supply unit 113 supplies power to the overall system in accordance with an application purpose. An external input/output terminal unit 114 inputs/outputs a communication signal and video signal to/from the outside. An operation unit 115 includes a button, dial, touch panel, and the like to allow a user to operate the system. A storage unit 116 stores various data such as video information. An orientation information control unit 117 determines the landscape orientation or portrait orientation of the image capture apparatus, and provides orientation information. A camera system control unit 118 controls the whole system.

A schematic operation of the image capture apparatus having the above arrangement will now be explained.

The operation unit 115 includes an image stabilization switch which allows the user to select the image stabilization mode. When the user selects the image stabilization mode with the image stabilization switch, the camera system control unit 118 instructs the image stabilization control unit 104 regarding the change in image stabilization mode selection. Upon receiving the instruction, the image stabilization control unit 104 performs image stabilization operations until it receives an image stabilization OFF instruction. The operation unit 115 includes a capture mode selection switch which allows the user to select either the still image capture mode or video capture mode. The operating conditions of both actuators can be changed either capture mode.

The operation unit 115 includes a shutter release button configured to turn on a first switch SW1 and second switch SW2 sequentially in accordance with how far the button is pressed. The shutter release button is pressed halfway to turn on the switch SW1, and fully to turn on the switch SW2. When the switch SW1 is turned on, the focus driving control unit 108 drives the focus lens unit 107 to adjust the focus. In addition, the stop/shutter driving control unit 106 drives the stop/shutter unit 105 to set a correct exposure. When the switch SW2 is turned on, the storage unit 116 stores image data obtained from an optical image formed by exposure on the image sensing unit 109.

The operation unit 115 includes a video recording switch. Video capture starts after the user presses the switch, and recording ends when the user presses the switch again during recording. The operation unit 115 also includes a playback mode selection switch which allows the user to select the playback mode. In the playback mode, the image stabilization operation stops.

The operation unit 115 also includes a zoom switch which designates a zoom. When the user designates a zoom with the zoom switch, the zoom driving control unit 102 receives the designation via the camera system control unit 118, drives the zoom lens unit 101, and moves it to the designated zoom position. At the same time, the focus driving control unit 108 drives the focus lens unit 107 to adjust the focus based on image information which has been sent from the image sensing unit 109 and processed by the signal processing units 110 and 111.

Figure 2:
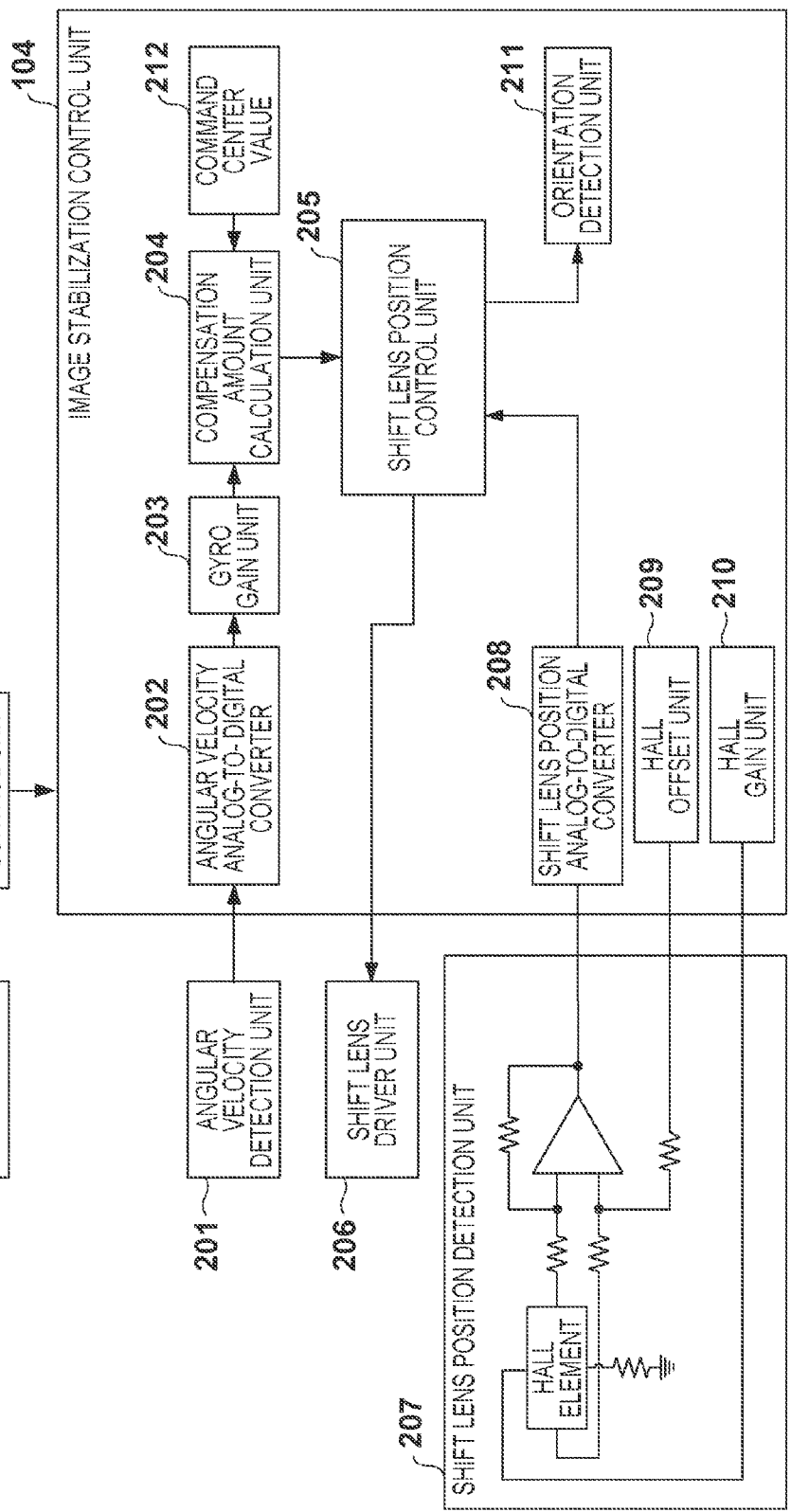
FIG. 2 is a block diagram showing an image stabilization control unit according to the embodiment of the present invention.

FIG. 2 is a block diagram for explaining in more detail an arrangement between the image stabilization control unit 104 and the camera system control unit 118. To drive the compensation lens unit 103, shakes (e.g., vibration, shaking or the like) are detected in the directions of two axes, Pitch and Yaw, which are perpendicular to each other and also perpendicular to the optical axis of the digital camera, which is defined as the Z-axis. The compensation lens unit 103 is driven in accordance with shakes in the Pitch and Yaw directions. Since control structures in the Pitch and Yaw directions are identical, only those for one axis will be explained. A shake detection unit 201 is, for example, a gyro sensor. The shake detection unit 201 detects angular velocity data and outputs it as a voltage. An angular velocity analog-to-digital converter 202 converts analog data output from the shake detection unit 201 into digital data.

A gyro gain unit 203 is an output adjustment unit which uniforms variations of outputs from the shake detection unit 201. A compensation amount calculation unit 204 integrates angular velocity data, converts it into angle data, and calculates shake compensation data in a direction opposite to the angle data. The compensation amount calculation unit 204 changes characteristics in accordance with the driving range of the compensation lens unit 103, and calculates a shake compensation amount (driving target value corresponding to the driving target position of the compensation lens unit 103). At this time, the driving target value (command value) is obtained by adding a shake compensation amount to a command center value 212. The range of the command value is equivalent to a shift lens analog-to-digital value (to be described later). The compensation amount calculation unit (target position calculation unit) outputs data to a shift lens position control unit 205.

A shift lens position detection unit 207 is a position detection unit using, for example, a Hall element. The shift lens position detection unit 207 detects position information in a direction perpendicular to the optical axis of the shift lens, and outputs it as a voltage. The Hall element is used here, but another detection means is also available. A shift lens position analog-to-digital converter 208 converts analog data output from the shift lens position detection unit 207 into digital data.

The shift lens position control unit 205 calculates the difference between the shake compensation amount and position data of the compensation lens unit 103 that has been detected by the shift lens position analog-to-digital converter 208, and performs feedback control to make the difference come close to 0. Finally, the shift lens position control unit 205 notifies a shift lens driver unit 206 of a signal for driving the compensation lens unit 103. Upon receiving the driving signal, the shift lens driver unit 206 drives the compensation lens unit 103 in accordance with the driving signal.

A Hall offset unit 209 applies a voltage to an amplification unit which amplifies an output from the Hall element of the shift lens position detection unit 207, giving a voltage offset to an amplified Hall output and adjusting the shift lens position.

A Hall gain unit 210 applies a predetermined voltage to the input of the Hall element of the shift lens position detection unit 207 to control the output from the Hall element. An orientation detection unit 211 determines the orientation of the image capture apparatus based on information from the shift lens position control unit 205.

Hall offset adjustment using the Hall offset unit 209 and Hall gain adjustment (setting of the shift lens position analog-to-digital resolution) using the Hall gain unit 210 will now be described in detail. A combination of Hall offset adjustment and Hall gain adjustment will be called Hall adjustment.

In a method of calculating the mechanical center of movement of the shift lens using the Hall offset unit 209, the Hall offset unit 209 is notified of a movement command to drive the shift lens to the limits of its driving range in the horizontal and vertical directions. Then, the Hall offset unit 209 drives the shift lens. A middle point between the limit points of the driving range serves as the mechanical center (calculation of the mechanical center by the Hall offset unit 209 is called a Hall offset adjustment value). The obtained center position of the shift lens is called a mechanical center, which serves as a driving center position in image stabilization (see FIG. 3A).

In a method of setting the shift lens position analog-to-digital resolution using the Hall gain unit 210 (see FIG. 3B), the shift lens position control unit 205 is notified of a movement command to drive the shift lens by a predetermined amount (e.g., 50 LSB (Least Significant Bit)) in the horizontal and vertical directions within the mechanical driving range. Then, the shift lens position control unit 205 drives the shift lens. The output of the Hall gain unit 210 is set so that the change amount of the angle of view at this time becomes 0.1°. The obtained output value is called a Hall gain value, and this adjustment is called a Hall gain adjustment. In a Hall gain adjustment, an LSB count with respect to the angle-of-view moving amount of 0.1° serves as the shift lens position analog-to-digital resolution. The embodiment adopts the shift lens position analog-to-digital resolution as its control accuracy. Note that Hall gain adjustment is executed at the telephoto end.

Figure 4:
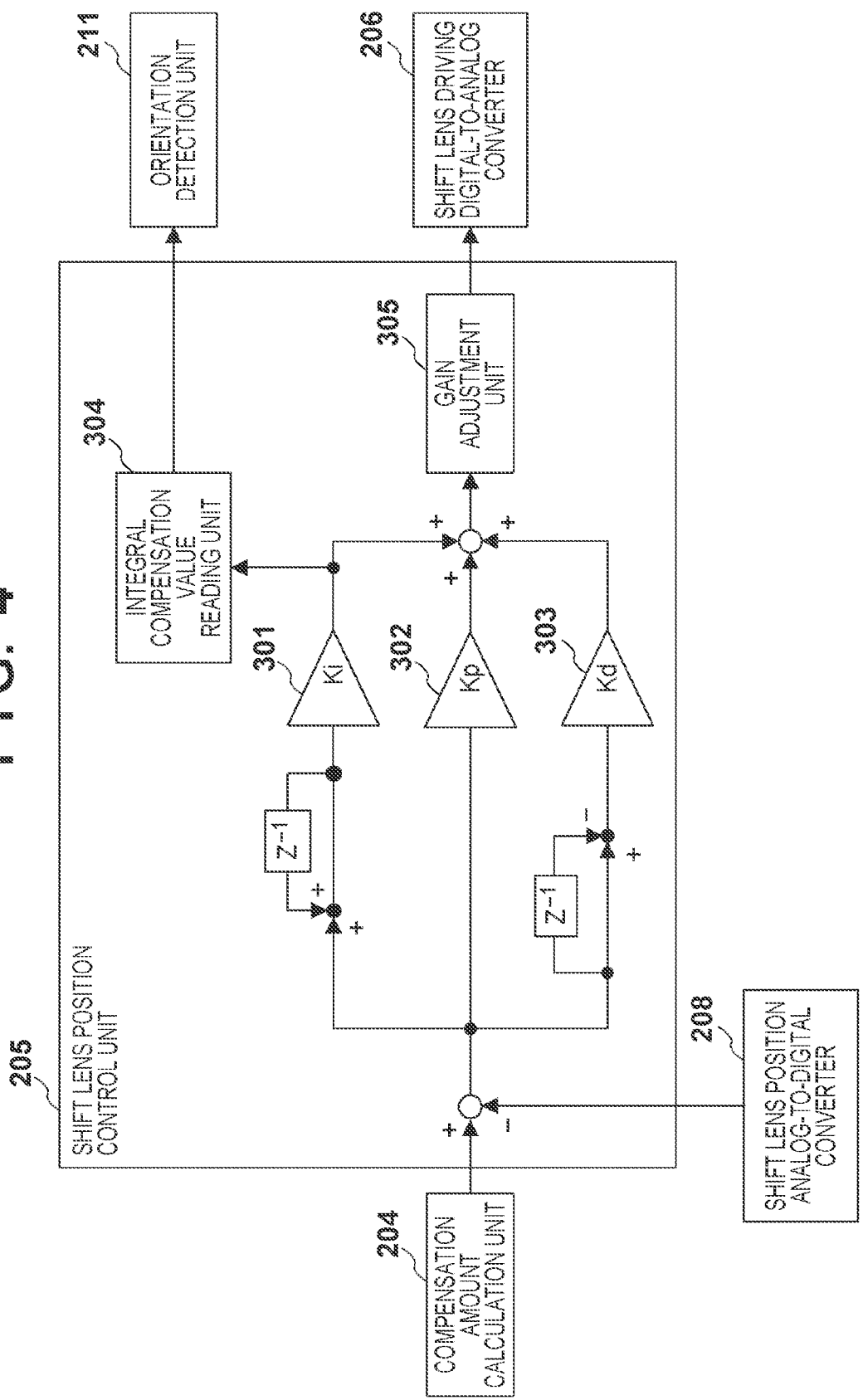
FIG. 4 is a block diagram showing a shift lens position control unit according to the embodiment of the present invention.

FIG. 4 is a block diagram showing the shift lens position control unit 205 in the embodiment. In FIG. 4, reference numeral 301 denotes an integral compensator (Ki); 302, a proportional compensator (Kp); and 303, a differential compensator (Kd). Reference numeral 304 denotes an integral compensation value reading unit; and 305, a gain adjustment unit which amplifies a value with respect to an output.

In the shift lens position control unit 205, the integral compensation value reading unit 304 receives an integral compensation value Evi, which is the output value of the integral compensator (Ki) 301, and uses it for orientation determination.

In PID control, the difference between the target position and the current position is defined as a deviation e. Then, an output feedback amount PIDout is given by equation (1):

$$PID_{out} = Kp \times e + Kd \times de/dt + Ki \int e \, dt \quad (1)$$

where $Ki \int e \, dt$ is the integral compensation value Evi.

In FIG. 4, the target position is a value calculated by the compensation amount calculation unit 204, and the current position is a value obtained by the shift lens position analog-to-digital converter 208. After PID control calculation, the shift lens driving digital-to-analog converter 208 is notified of the result of multiplication by a predetermined gain value (normally 1 in general) by the gain adjustment unit 305.

FIGS. 5A and 5B exemplify the shift lens analog-to-digital resolution. In the embodiment, the analog-to-digital range of the shift lens falls from 0 to 600, and the center position is 300. On the still image capture mode basis, as in FIG. 5A, assume that the shift lens driving amount when the angle of view changes by 0.4° at the telephoto end by Hall gain adjustment is set to 200 LSB. A higher shift lens analog-to-digital resolution can provide a more significant image stabilization effect in still image capture. Thus, the resolution at the telephoto end is maximized.

The analog-to-digital resolution at the wide-angle end is determined by the difference between moving amounts of the compensation lens unit 103 per predetermined angle-of-view change amount between the telephoto end and the wide-angle end (the moving amount will be called sensitivity). The value of the shift lens sensitivity changes depending on the lens structure and type.

For example, assume that the sensitivity ratio between the telephoto end and the wide-angle end is 2:1 for a low-magnification lens. When the shift lens analog-to-digital resolution for the angle-of-view change amount of 0.4° at the telephoto end is set to 200 LSB, the shift lens analog-to-digital resolution at the wide-angle end becomes 100 LSB. At this time, the movable range of the compensation lens unit 103 becomes ±1.2° at the wide-angle end under limitations on the analog-to-digital range. If a shake is compensated for in the dynamic mode in video capture at this setting, the analog-to-digital range runs short and cannot cope with a higher degree of camera shake, such as when shooting while walking.

To compensate for a higher degree of camera shake in the video capture mode, as shown in FIG. 5B, the movable range of the compensation lens unit 103 must be set as wide as 4.8° at the wide-angle end. However, simply setting the analog-to-digital resolution to widen the movable range of the compensation lens unit 103 at the wide-angle end (25 LSB per 0.4°) decreases the analog-to-digital resolution at the telephoto end (50 LSB per 0.4°). If the video capture mode switches to the still image capture mode to capture a still image at this setting, the image stabilization effect is greatly reduced.

When performing shake compensation at low shift lens analog-to-digital resolution in the video capture mode, degradation of the image stabilization effect is less conspicuous for video recording than for still image recording, and it is barely recognizable even if the analog-to-digital resolution is decreased to a certain degree. This is because the number of recording pixels is smaller for video recording than for still image recording. As for the image quality, degradation of the resolution of a video less stands out than that of the resolution of a still image.

As described above, if the analog-to-digital resolution is adjusted for a still image, no movable range can be ensured for video recording. Compensating for a higher degree of camera shake in video capture lowers the image stabilization effect for still image capture.

To prevent this, the embodiment adopts a means for switching the shift lens analog-to-digital resolution in switching between the still image capture mode and the video capture mode, as shown in FIGS. 6A and 6B. As the switching method, the Hall gain value (analog gain) is changed. This method will be explained below with reference to the flowchart of FIG. 7.

In the embodiment, the analog-to-digital resolution is switched using the Hall adjustment value at the start of video recording and the end of video recording. However, when switching of the analog-to-digital resolution using the Hall adjustment value, an analog-to-digital resolution for video capture may only be set during video recording. In an image capture apparatus which does not switch between the still image capture mode and the video capture mode, the analog-to-digital resolution is switched using the Hall adjustment value at the start of video recording and at the end of video recording. More specifically, an analog-to-digital resolution for still image capture is set during normal standby, and an analog-to-digital resolution for video capture is set only during video recording.

Figure 8A:
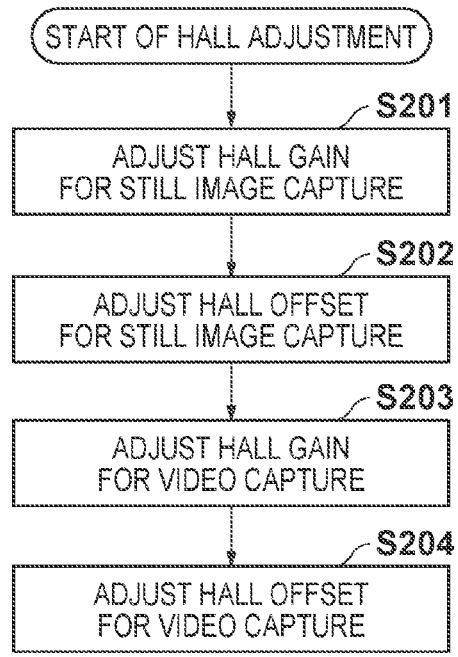
FIGS. 8A-8C are flowcharts showing the Hall gain adjustment and Hall offset adjustment.
Figure 8B:
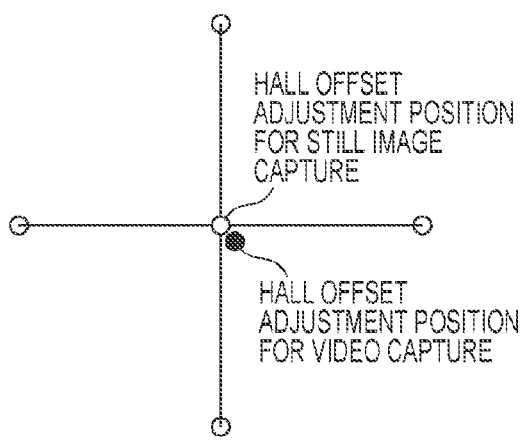
Figure 8C:
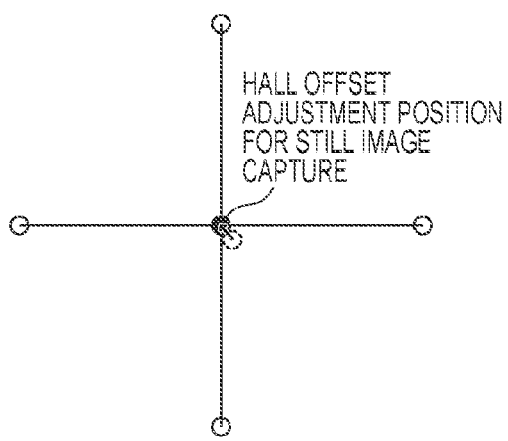

Hall gain adjustment and Hall offset adjustment for switching the analog-to-digital resolution will now be described. To switch the shift lens analog-to-digital resolution in switching between the still image capture mode and the video capture mode, Hall gain adjustment and Hall offset adjustment suited to each capture mode must be performed at the telephoto end. FIGS. 8A-C are flowcharts showing Hall gain adjustment and Hall offset adjustment. In the embodiment, the analog-to-digital width per 0.4° is 200 LSB in the still image capture mode and 50 LSB in the video capture mode.

In step S201, Hall gain adjustment in FIG. 3B is performed for still image capture. For example, the Hall gain is adjusted so that the angle of view changes by 0.4° when the shift lens is driven by 200 LSB. In step S202, Hall offset adjustment in FIG. 3A is performed for still image capture.

After the end of Hall gain adjustment and Hall offset adjustment for still image capture, Hall gain adjustment and Hall offset adjustment for video capture are performed (step S203).

Next, the reason that not only the Hall gain adjustment value but also the Hall offset adjustment value is switched in switching the analog-to-digital resolution will be described. The change of the Hall output voltage value upon a change in the Hall offset adjustment value by 1 LSB is constant in the circuit arrangement. When a shift lens analog-to-digital width per 0.4° is set by Hall gain adjustment, a Hall output voltage width per 0.4° angle of view is also determined. For example, the voltage width differs by four times between analog-to-digital widths of 200 LSB and 50 LSB per 0.4°. Even the compensation angle-of-view amount per LSB of the Hall offset value differs by four times between them. When the Hall gain value is changed, the corresponding Hall offset value also changes. As a result, changing the analog-to-digital resolution requires changing both the Hall gain adjustment value and the Hall offset adjustment value.

In step S203, Hall gain adjustment for video capture is performed. In this case, the Hall gain is adjusted to change the angle of view by 0.4° when driving the shift lens by 50 LSB. In Hall gain adjustment for video capture, the ratio of the analog-to-digital width to change the angle of view by 0.4° may be set as the Hall gain adjustment value. The calculation equation in this case is given by equation (2):

$$\text{Hall gain adjustment value for video capture} = \text{Hall gain adjustment value for still image capture} \times \text{video analog-to-digital width}/\text{still image analog-to-digital width} \quad (2)$$

In step S204, Hall offset adjustment for video capture is performed. In Hall offset adjustment for video capture, the driving center position for video capture is adjusted to coincide with that of the Hall offset adjustment for still image capture that has been obtained in step S201, instead of re-obtaining the mechanical center using mechanical driving limit points as in FIG. 3A. However, as described above, for video capture the compensation angle-of-view amount per LSB of the Hall offset value increases by four times. Only with the Hall offset may it not be possible to adjust the driving center position.

If the driving center position differs between still image capture and video capture, the angle of view will change from the one the user desired when switching the analog-to-digital resolution.

In this case, in addition to the Hall offset, the driving center position is adjusted using the command center value 212 for shift lens control. The shift lens control changes the angle of view per LSB more finely than by using the Hall offset, so the driving center position can be adjusted with higher accuracy. In this way, when both the Hall offset and command center value are used to adjust the driving center position, both the Hall adjustment value and command center value are switched in switching the analog-to-digital resolution.

According to the flowchart of FIG. 8A, Hall gain adjustment and Hall offset adjustment for video capture (steps S203 and S204) are performed after Hall gain adjustment and Hall offset adjustment for still image capture (steps S201 and S202). However, Hall gain adjustment and Hall offset adjustment for video capture may be executed first.

Switching of the analog-to-digital resolution will be explained next with reference to the flowchart of FIG. 7.

Control in FIG. 7 assumes that Hall gains and Hall offset adjustment values suitable for both still image capture mode and video capture mode are set in advance at the telephoto end upon shipment from the factory.

When the image capture apparatus is turned on in step S101, the process shifts to step S102. If it is determined in step S102 that the capture mode switch has been operated, the process advances to step S103. In step S103, it is determined whether the capture mode is the still image capture mode or the video capture mode. If the capture mode is the still image capture mode, the process advances to step S104. In step S104, Hall adjustment values (Hall gain adjustment value and Hall offset adjustment value) for a still image are set. Accordingly, the shift lens analog-to-digital resolution is set for the still image capture mode.

Next, the reason that not only the Hall gain adjustment value but also the Hall offset adjustment value is switched when switching the analog-to-digital resolution will be described. The change of the Hall output voltage value upon a change in the Hall offset adjustment value by 1 LSB is constant in the circuit arrangement. When a shift lens analog-to-digital width per 0.4° is set by Hall gain adjustment, a Hall output voltage width per 0.4° angle of view is also determined. For example, the voltage width differs by four times between analog-to-digital widths of 200 LSB and 50 LSB per 0.4°. Even the compensation angle-of-view amount per LSB of the Hall offset value differs by four times between them. When the Hall gain value is changed, the corresponding Hall offset value also changes. As a consequence, changing the analog-to-digital resolution requires changing both the Hall gain and the Hall offset values.

After that, the process advances to step S105. In step S105, a command value for a still image is set. In the still image capture mode, conversion of the command value is given by equation (3):

$$\text{still image command value} = \text{shake compensation amount} + \text{command center value} \quad (3)$$

The process then advances to step S106 to set various image stabilization parameters for a still image. These image stabilization parameters include a parameter for controlling how an image looks in a panning operation, the gain value (gain adjustment unit 305) of shift lens control, and the movable range of the compensation lens unit 103.

The process advances to step S110 to determine whether the power switch is ON. If the power switch is ON, the process returns to step S102 to continue the image stabilization operation and monitor the mode switch. If the power switch is OFF, the process ends. If the mode switch has not been changed in step S102, the process advances to step S110 to perform the above operation.

If it is determined in step S103 that the capture mode is the video capture mode, the process advances to step S107 to set Hall adjustment values for a video. Thereafter, the process advances to step S108 to convert and set a command value for a video in accordance with equation (4):

$$\text{video command value} = (\text{still image command value} - \text{still image command center value}) \times (\text{video analog-to-digital width}/\text{still image analog-to-digital width}) + \text{command center value} \quad (4)$$

The process advances to step S109 to set image stabilization parameters for a video. Image stabilization parameter setting items for a video are the same as those for a still image in step S106.

Preferred embodiments of the present invention have been described above. However, the present invention is not limited to these embodiments, and can be variously changed and modified without departing from the scope of the invention.

The present invention is applicable to, for example, an optical device such as an interchangeable lens for a digital single-lens reflex camera or digital video camera, an image capture apparatus such as a digital video camera, or an image capture apparatus-mounted electronic device such as a cell phone or game machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-246750, filed Nov. 2, 2010 and 2010-271953, filed Dec. 6, 2010 which are hereby incorporated by reference herein in their entirety.

What is claimed is:

1. An optical device comprising:
   an image blur compensation unit which compensates a blur in an image formed by an imaging optical system, the image blur compensation unit being movable in directions not parallel to an optical axis of the imaging optical system;
   a shake detection unit which detects shake of the optical device;
   a position detection unit which detects a position of the image blur compensation unit, the position detection unit having a position resolution that is variable; and
   a driving control unit which calculates a driving target position of the image blur compensation unit based on an output from the shake detection unit and position information of the image blur compensation unit that is detected by the position detection unit,
   wherein the driving control unit sets a first movable range as a range in which the image blur compensation unit can be driven when video is captured, and sets a second movable range which is narrower than the first movable range as a range in which the image blur compensation unit can be driven when a still image is captured, and
   wherein the position resolution of the position detection unit when the second movable range is set is greater than the position resolution of the position detection unit when the first movable range is set.

2. The optical device according to claim 1, wherein the driving control unit switches an analog gain of the position detection unit.

3. The optical device according to claim 1, wherein the driving control unit changes the position resolution of the position detection unit at a start of video capture and an end of video capture.

4. The optical device according to claim 1, wherein the driving unit switches the position resolution of the position detection unit in switching at a start of video capture and at an end of video capture.

5. The optical device according to claim 1, wherein the driving control unit converts a command value of a target position calculation unit which calculates a target position of the image blur compensation unit in switching the position resolution of the position detection unit, and changes a parameter for controlling how an image looks, a gain for controlling the position of the image blur compensation unit, and a movable range of the image blur compensation unit.

6. An image capture apparatus having an optical device, the optical device comprising:
   an image blur compensation unit which compensates a blur in an image formed by an imaging optical system, the image blur compensation unit being movable in directions not parallel to an optical axis of the imaging optical system;
   a shake detection unit which detects shake of the optical device;
   a position detection unit which detects a position of the image blur compensation unit, the position detection unit having a position resolution that is variable; and
   a driving control unit which calculates a driving target position of the image blur compensation unit based on an output from the shake detection unit and position information of the image blur compensation unit that is detected by the position detection unit,
   wherein the driving control unit sets a first movable range as a range in which the image blur compensation unit can be driven when video is captured, and sets a second movable range which is narrower than the first movable range as a range in which the image blur compensation unit can be driven when a still image is captured, and
   wherein the position resolution of the position detection unit when the second movable range is set is greater than the position resolution of the position detection unit when the first movable range is set.

7. An optical device control method comprising:
   causing an image blur compensation unit, movable in a plurality of directions not parallel to an optical axis of an imaging optical system, to compensate for a blur in an image formed by an imaging optical system;
   causing a shake detection unit to detect shake of the optical device;
   causing a position detection unit having variable position resolution to detect a position of the image blur compensation unit; and
   calculating a driving target position of the image blur compensation unit based on an output from the shake detection unit and position information of the image blur compensation unit that is detected by the position detection unit,
   wherein a first movable range as a range in which the image blur compensation unit can be driven is set when video is captured, and a second movable range which is narrower than the first movable range as a range in which the image blur compensation unit can be driven is set when a still image is captured, and
   wherein the position resolution of the position detection unit when the second movable range is set is greater than the position resolution of the position detection unit when the first movable range is set.

8. An optical device comprising:
   an image blur compensation unit which compensates a blur in an image formed by an imaging optical system, the image blur compensation unit being movable in directions not parallel to an optical axis of the imaging optical system;
   a shake detection unit which detects shake of the optical device;
   a position detection unit which detects a position of the image blur compensation unit; and
   a driving control unit which calculates a driving target position of the image blur compensation unit based on an output from the shake detection unit and position information of the image blur compensation unit that is detected by the position detection unit, the driving control unit controlling a position resolution of the image blur compensation unit,
   wherein the driving control unit sets a first movable range as a range in which the image blur compensation unit can be driven when video is captured, and sets a second movable range which is narrower than the first movable range as a range in which the image blur compensation unit can be driven when a still image is captured, and wherein the position resolution of the image blur compensation unit when the second movable range is set is greater than the position resolution of the image blur compensation unit when the first movable range is set.

9. An optical device control method comprising:

causing an image blur compensation unit, movable in a plurality of directions not parallel to an optical axis of an imaging optical system, to compensate for a blur in an image formed by an imaging optical system;

causing a shake detection unit to detect shake of the optical device;

causing a position detection unit to detect a position of the image blur compensation unit; and calculating a driving target position of the image blur compensation unit based on an output from the shake detection unit and position information of the image blur compensation unit that is detected by the position detection unit, the image blur compensation unit having a position resolution that is variable, wherein a first movable range as a range in which the image blur compensation unit can be driven is set when video is captured, and a second movable range which is narrower than the first movable range as a range in which the image blur compensation unit can be driven is set when a still image is captured, and wherein the position resolution of the image blur compensation unit when the second movable range is set is greater than the position resolution of the image blur compensation unit when the first movable range is set.

10. The optical device according to claim 8, wherein the driving control unit switches an analog gain of the position detection unit.

11. The optical device according to claim 8, wherein the driving control unit changes the position resolution of the position detection unit at a start of video capture and an end of video capture.

12. The optical device according to claim 8, wherein the driving control unit switches the position resolution of the position detection unit in switching at a start of video capture and at an end of video capture.

13. The optical device according to claim 8, wherein the driving control unit converts a command value of a target position calculation unit which calculates a target position of the image blur compensation unit in switching the position resolution of the position detection unit, and changes a parameter for controlling how an image looks, a gain for controlling the position of the image blur compensation unit, and a movable range of the image blur compensation unit.

14. An image capture apparatus having an optical device, the optical device comprising:

an image blur compensation unit which compensates a blur in an image formed by an imaging optical system, the image blur compensation unit being movable in directions not parallel to an optical axis of the imaging optical system;

a shake detection unit which detects shake of the optical device;

a position detection unit which detects a position of the image blur compensation unit; and a driving control unit which calculates a driving target position of the image blur compensation unit based on an output from the shake detection unit and position information of the image blur compensation unit that is detected by the position detection unit, the driving control unit controlling a position resolution of the image blur compensation unit, wherein the driving control unit sets a first movable range as a range in which the image blur compensation unit can be driven when video is captured, and sets a second movable range which is narrower than the first movable range as a range in which the image blur compensation unit can be driven when a still image is captured, and wherein the position resolution of the image blur compensation unit when the second movable range is set is greater than the position resolution of the image blur compensation unit when the first movable range is set.

* * * * *